(12) United States Patent
Utsunomiya et al.

(10) Patent No.: US 12,248,205 B2
(45) Date of Patent: Mar. 11, 2025

(54) OPTICAL MODULATION ELEMENT AND METHOD FOR DRIVING OPTICAL MODULATION ELEMENT

(71) Applicant: TDK CORPORATION, Tokyo (JP)

(72) Inventors: Hajime Utsunomiya, Tokyo (JP); Takashi Kikukawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 230 days.

(21) Appl. No.: 17/924,517

(22) PCT Filed: Jul. 13, 2021

(86) PCT No.: PCT/JP2021/026216
§ 371 (c)(1),
(2) Date: Nov. 10, 2022

(87) PCT Pub. No.: WO2022/034767
PCT Pub. Date: Feb. 17, 2022

(65) Prior Publication Data
US 2023/0176403 A1 Jun. 8, 2023

(30) Foreign Application Priority Data
Aug. 11, 2020 (JP) ................... 2020-135862

(51) Int. Cl.
*G02F 1/035* (2006.01)
*G02F 1/21* (2006.01)
*G02F 1/225* (2006.01)

(52) U.S. Cl.
CPC ............ *G02F 1/035* (2013.01); *G02F 1/212* (2021.01); *G02F 1/225* (2013.01); *G02F 2202/20* (2013.01); *G02F 2203/50* (2013.01)

(58) Field of Classification Search
None
See application file for complete search history.

(56) References Cited

U.S. PATENT DOCUMENTS 6,334,004 B1 12/2001 Ohkuma et al.
9,664,931 B1 5/2017 Yap et al.
(Continued)

FOREIGN PATENT DOCUMENTS

JP 2000-180804 A 6/2000
JP 2004-037695 A 2/2004
(Continued)

OTHER PUBLICATIONS

Sep. 14, 2021 International Search Report issued in International Patent Application No. PCT/JP2021/026216.
(Continued)

*Primary Examiner* — Jerry Rahll
(74) *Attorney, Agent, or Firm* — Oliff PLC (57) ABSTRACT

This optical modulation element includes a first optical waveguide, a second optical waveguide, a first electrode for applying an electric field to the first optical waveguide, and a second electrode for applying an electric field to the second optical waveguide. The first optical waveguide and the second optical waveguide each include a ridge-shaped portion protruding from a first surface of a lithium niobate film. A first interaction length $L_1$ that is a length of a part of the first electrode overlapping the first optical waveguide in a longitudinal direction is 0.9 mm or more and 20 mm or less. A second interaction length $L_2$ that is a length of a part of the second electrode overlapping the second optical waveguide in the longitudinal direction is 0.9 mm or more and 20 mm or less.

3 Claims, 5 Drawing Sheets

(56) References Cited

U.S. PATENT DOCUMENTS

| | | | |
|---|---|---|---|
| 2004/0061922 A1 | 4/2004 | Mauro et al. | |
| 2009/0324165 A1 | 12/2009 | Sugiyama | |
| 2015/0138619 A1* | 5/2015 | Iwatsuka | G02F 1/035 359/245 |
| 2017/0052424 A1* | 2/2017 | Iwatsuka | G02B 6/122 |
| 2019/0146302 A1* | 5/2019 | Iwatsuka | G02F 1/035 385/2 |
| 2020/0310216 A1* | 10/2020 | Iwatsuka | G02F 1/2255 |

FOREIGN PATENT DOCUMENTS

| | | | |
|---|---|---|---|
| JP | 2007-094440 A | 4/2007 |
| JP | 4164179 B2 | 10/2008 |
| JP | 2009-205154 A | 9/2009 |
| JP | 2010-008887 A | 1/2010 |
| JP | 2014-006348 A | 1/2014 |
| JP | 2019-045880 A | 3/2019 |

OTHER PUBLICATIONS

Dec. 6, 2022 Office Action issued in Japanese Patent Application No. 2020-135862.

\* cited by examiner

OPTICAL MODULATION ELEMENT AND METHOD FOR DRIVING OPTICAL MODULATION ELEMENT

TECHNICAL FIELD

The present invention relates to an optical modulation element and a method for driving an optical modulation element. This application claims the benefit of priority from Japanese Patent Application No. 2020-135862, filed on Aug. 11, 2020, the content of which is incorporated herein.

BACKGROUND ART

The volume of communication has increased drastically with the spread of the Internet, and the importance of optical fiber communication has risen significantly. Optical fiber communication, in which an electrical signal is converted into an optical signal and the optical signal is transmitted through an optical fiber, is characterized by a wide band, a low loss, and resistance to noise.

Optical modulators convert an electrical signal into an optical signal. For example, Patent Document 1 and Patent Document 2 disclose Mach-Zehnder-type optical modulators in which optical waveguides are formed by Ti (titanium) diffusion near a surface of a lithium niobate single crystal substrate. In addition, Patent Document 2 discloses that an operating point drift of the optical modulator is corrected. The optical modulators disclosed in Patent Document 1 and Patent Document 2 operate at a high speed such as 40 Gb/s or faster but have a long overall length such as around 10 cm.

In contrast, Patent Document 3 discloses a Mach-Zehnder-type optical modulator using a c-axis-oriented lithium niobate film. Compared to an optical modulator in which an optical waveguide is formed near a surface of a lithium niobate single crystal substrate by Ti diffusion, an optical modulator using a lithium niobate film has a small size and uses a low drive voltage.

CITATION LIST

Patent Document

[Patent Document 1]
Japanese Unexamined Patent Application, First Publication No. 2004-37695
[Patent Document 2]
Japanese Patent No. 4164179
[Patent Document 3]
Japanese Unexamined Patent Application, First Publication No. 2019-45880

SUMMARY OF INVENTION

Technical Problem

Since optical modulators using lithium niobate have a large extinction ratio and can be operated in a high-frequency band, they are used for long-distance communication such as inter-city communication. However, in recent years, due to increase in the amount of information, there is a demand for a higher frequency band. In addition, at the same time, there is also a demand for a lower drive voltage. Meanwhile, in recent years, communication within a data center or between data centers has increased, and short/intermediate-range communication such as communication between data centers has also increased. Since a large extinction ratio is not required for such application, there are cases in which optical modulators using silicon are used or there are cases in which emitted light is directly modulated by a laser diode drive circuit without using an optical modulator. It is not possible to cope with further increase in the frequency band with modulation by means of an optical modulator using silicon or direct modulation.

Regarding optical modulators using a lithium niobate film, although a drive voltage can be reduced compared to an optical modulator in which an optical waveguide is formed near a surface of a lithium niobate single crystal substrate by Ti diffusion, they are still not able to cope with low-drive voltage drivers (2.0 V or more and 4.3 V or less) used in optical modulators using silicon.

The present invention has been made in consideration of the foregoing problems, and an object thereof is to provide an optical modulation element using a lithium niobate film which can be used in a high-frequency band and allows low-voltage driving, and a method for driving an optical modulation element using a lithium niobate film which can be driven at a low voltage.

Solution to Problem (1) An optical modulation element according to an aspect of the present invention includes a first optical waveguide, a second optical waveguide, a first electrode configured to apply an electric field to the first optical waveguide, and a second electrode configured to apply an electric field to the second optical waveguide. Each of the first optical waveguide and the second optical waveguide includes a ridge-shaped portion protruding from a first surface of a lithium niobate film. A first interaction length L1 that is a length of a part of the first electrode overlapping the first optical waveguide in a longitudinal direction is 0.9 mm or more and 20 mm or less. A second interaction length L2 that is a length of a part of the second electrode overlapping the second optical waveguide in the longitudinal direction is 0.9 mm or more and 20 mm or less.

(2) In the optical modulation element according to the foregoing (1), an applied voltage width Vpp that is an amplitude of an applied voltage applied to a part between the first electrode and the second electrode may be 2.0 V or more and 4.3 V or less, and a half-wavelength voltage $V\pi$ may be equal to or higher than the applied voltage width Vpp.

(3) A method for driving an optical modulation element according to another aspect of the present invention is a method for driving an optical modulation element which has a first optical waveguide and a second optical waveguide, each of which includes a ridge-shaped portion protruding from a first surface of a lithium niobate film, a first electrode at a position overlapping the first optical waveguide in a plan view, and a second electrode at a position overlapping the second optical waveguide in a plan view, and in which a first interaction length L1 that is a length of a part of the first electrode overlapping the first optical waveguide in a longitudinal direction is 0.9 mm or more and 20 mm or less and a second interaction length L2 that is a length of a part of the second electrode overlapping the second optical waveguide in the longitudinal direction is 0.9 mm or more and 20 mm or less. An applied voltage width Vpp is 2.0 V or more and 4.3 V or less.

(4) In the method for driving an optical modulation element according to (3), a half-wavelength voltage $V\pi$ may be equal to or higher than the applied voltage width Vpp.

(5) In the method for driving an optical modulation element according to (3) or (4), Vpp/Vn may be 0.03 or more and 0.47 or less.

Advantageous Effects of Invention

According to the foregoing aspect, it is possible to provide an optical modulation element using a lithium niobate film which allows low-voltage driving, and a method for driving an optical modulation element using a lithium niobate film which can be driven at a low voltage.

DESCRIPTION OF EMBODIMENT

Hereinafter, the present embodiment will be described in detail suitably with reference to the drawings. In the drawings used in the following description, in order to make characteristics easy to understand, characteristic parts may be illustrated in an enlarged manner for the sake of convenience, and dimensional ratios or the like of each constituent element may differ from actual values thereof. Materials, dimensions, and the like exemplified in the following description are examples. The present invention is not limited thereto and can be suitably changed and performed within a range exhibiting the effects of the present invention.

First, directions will be defined. One direction on one surface of a substrate Sb will be referred to as an x direction, and a direction orthogonal to the x direction will be referred to as a y direction. For example, the x direction is a direction in which a first optical waveguide 11 extends. A z direction is a direction perpendicular to the substrate Sb. The z direction is a direction orthogonal to the x direction and the y direction. Hereinafter, the positive z direction may be expressed as "upward", and the negative z direction may be expressed as "downward". The upward and downward directions do not necessarily coincide with the direction in which the force of gravity acts.

Figure 1:
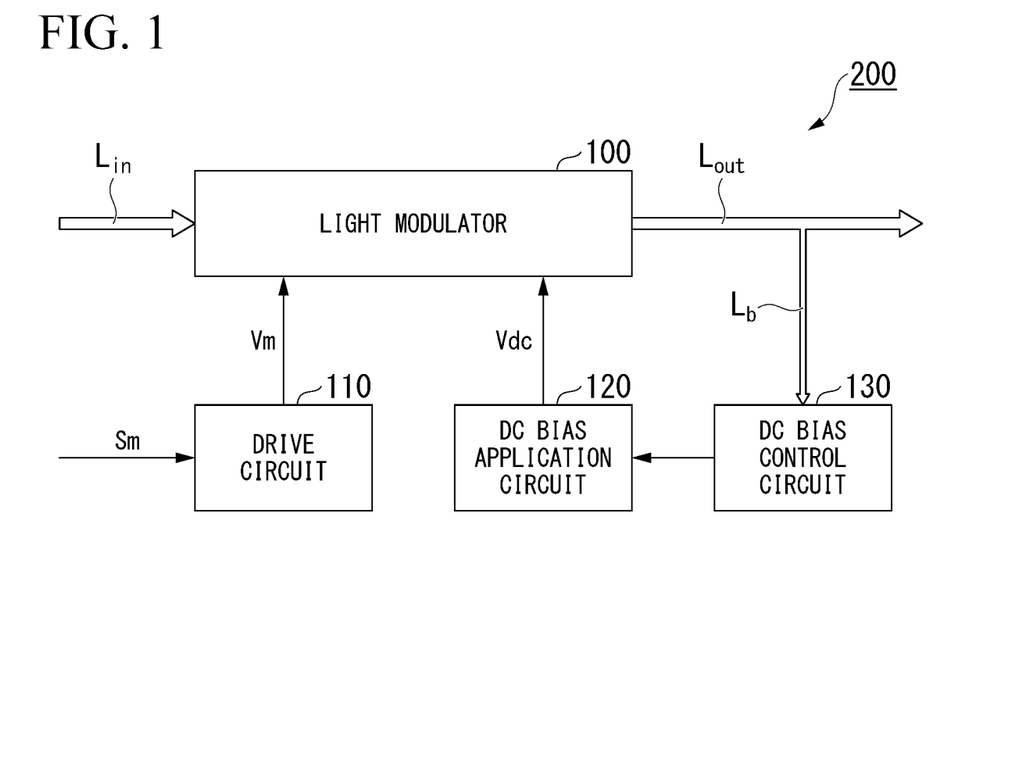
FIG. 1 is a block diagram of an optical modulator according to a first embodiment.

FIG. 1 is a block diagram of an optical modulator 200 according to a first embodiment. The optical modulator 200 has an optical modulation element 100, a drive circuit 110, a DC bias application circuit 120, and a DC bias control circuit 130. A control unit of the optical modulator 200 has the drive circuit 110, the DC bias application circuit 120, and the DC bias control circuit 130.

The optical modulation element 100 converts an electrical signal into an optical signal. The optical modulation element 100 converts input light $L_{in}$, which has been input thereto, into output light $L_{out}$ in accordance with a modulation signal Sm.

The drive circuit 110 applies a modulation voltage Vm corresponding to the modulation signal Sm to the optical modulation element 100. The DC bias application circuit 120 applies a DC bias voltage Vdc to the optical modulation element 100. The DC bias control circuit 130 monitors the output light $L_{out}$ and controls the DC bias voltage Vdc output from the DC bias application circuit 120. An operating point Vd (which will be described below) is controlled by adjusting this DC bias voltage Vdc.

Figure 2:
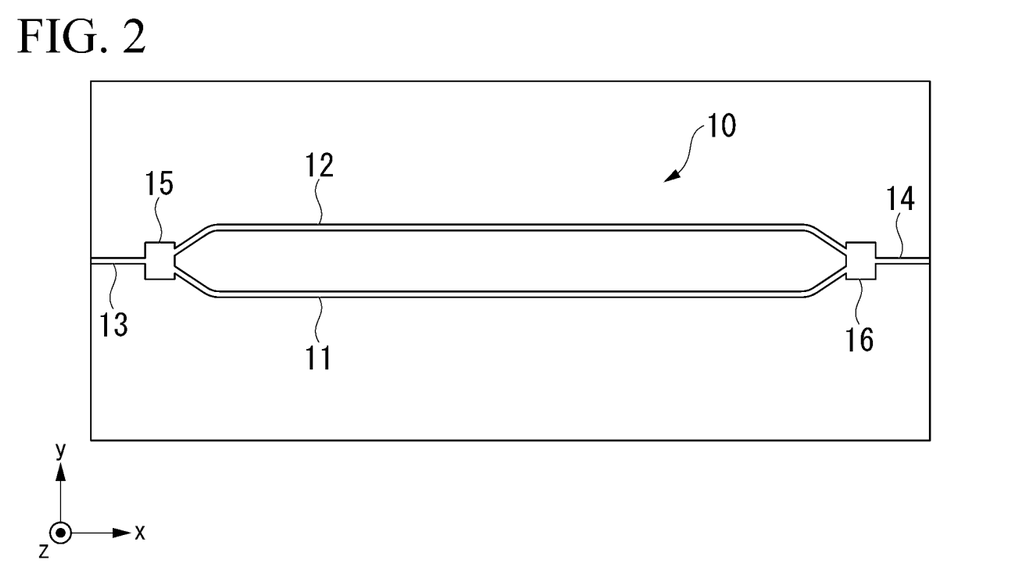
FIG. 2 is a plan view of an optical waveguide according to the first embodiment.
Figure 3:
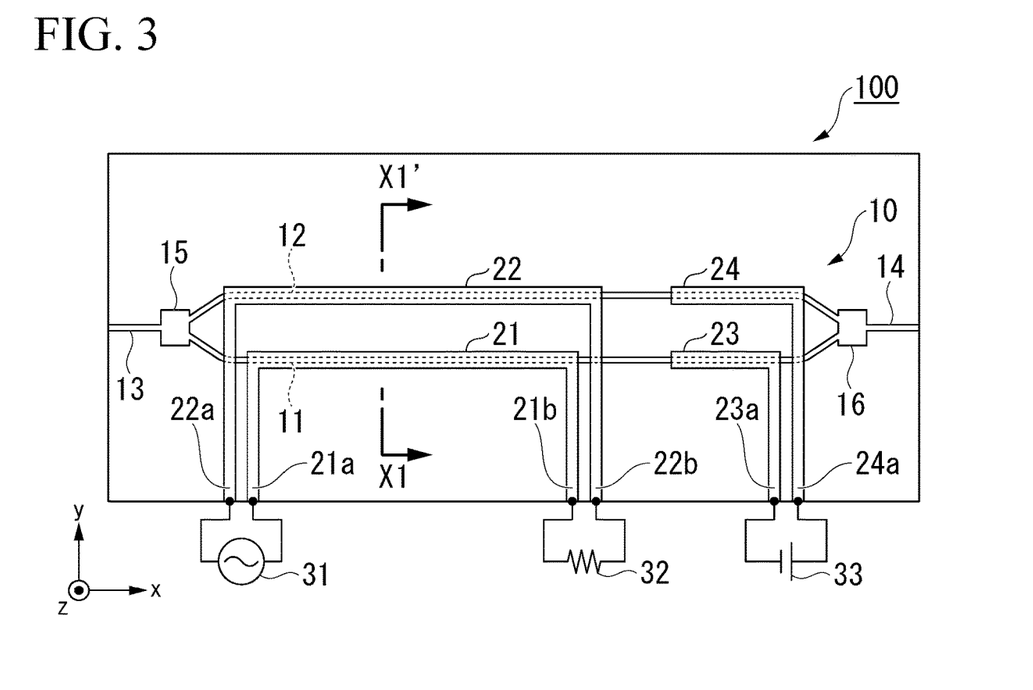
FIG. 3 is a plan view of an optical modulation element according to the first embodiment.
Figure 4:
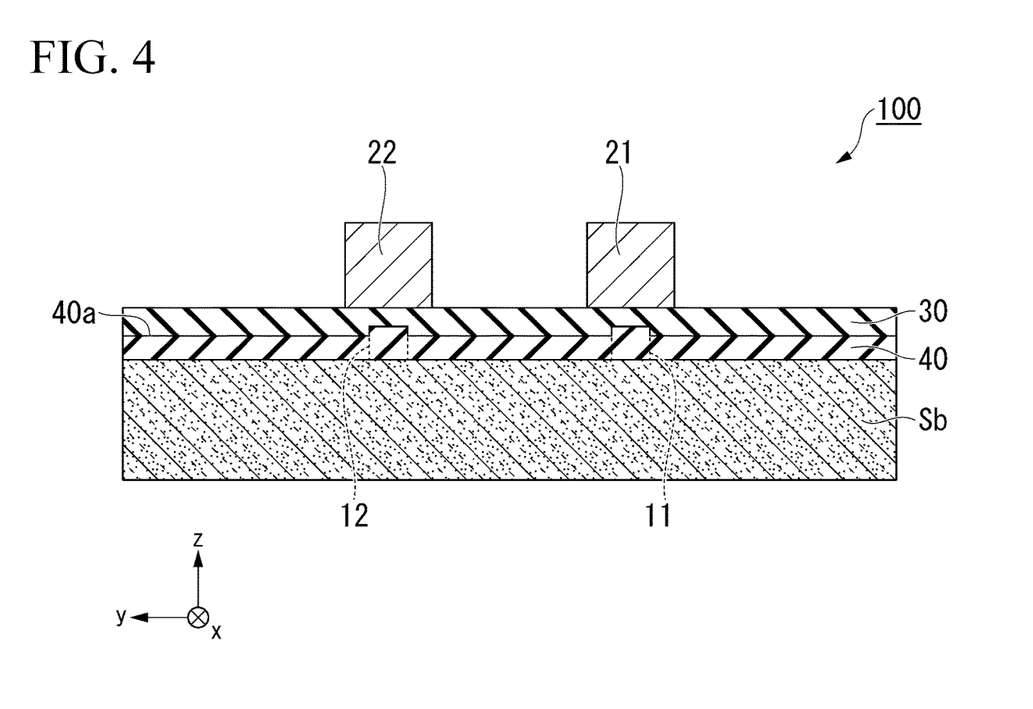
FIG. 4 is a cross-sectional view of the optical modulation element according to the first embodiment.

FIG. 2 is a plan view of an optical waveguide 10 of the optical modulation element 100 viewed in the z direction. FIG. 3 is a plan view of the optical modulation element 100 viewed in the z direction. FIG. 4 is a cross section cut along X1-X1' in FIG. 3. The optical modulation element 100 has the optical waveguide 10 and electrodes 21, 22, 23, and 24.

The optical modulation element 100 is located on the substrate Sb. The substrate Sb need only be a substrate on which an oxide film 40 such as a lithium niobate film can be formed as an epitaxial film, and it is preferably a sapphire single crystal substrate or a silicon single crystal substrate. A crystal orientation of the substrate Sb is not particularly limited. The lithium niobate film has properties of being easily formed as a c-axis-oriented epitaxial film with respect to the substrate Sb having various crystal orientations. Since a crystal constituting a c-axis-oriented lithium niobate film has three-fold symmetry, it is desired that the substrate Sb (base material) also have the same symmetry. In the case of a sapphire single crystal substrate, a substrate of a c-plane is preferable, and in the case of a silicon single crystal substrate, a substrate of a (111) plane is preferable.

The optical waveguide 10 is a light passage in which light is propagated. For example, the optical waveguide 10 has the first optical waveguide 11, a second optical waveguide 12, an input path 13, an output path 14, a branch portion 15, and a coupling portion 16. For example, the first optical waveguide 11 and the second optical waveguide 12 extend in the x direction. The first optical waveguide 11 and the second optical waveguide 12 have substantially the same length in the x direction. The branch portion 15 is located between the input path 13, and the first optical waveguide 11 and the second optical waveguide 12. The input path 13 leads to the first optical waveguide 11 and the second optical waveguide 12 with the branch portion 15 therebetween. The coupling portion 16 is located between the first optical waveguide 11 and the second optical waveguide 12, and the output path 14. The first optical waveguide 11 and the second optical waveguide 12 lead to the output path 14 with the coupling portion 16 therebetween.

The optical waveguide 10 includes the first optical waveguide 11 and the second optical waveguide 12 which are ridge-shaped portions protruding from a first surface 40a of the oxide film 40. The first surface 40a is an upper surface in a part other than the ridge-shaped portions of the oxide film 40. The ridge-shaped portions protrude in the z direction from the first surface 40a and extend along the optical waveguide 10. The shape of an X1-X1' cross section (a cross section perpendicular to a traveling direction of light) of each ridge-shaped portion may be any shape as long as it is a shape capable of guiding light, and it may be a dome shape, a triangular shape, or a rectangular shape, for example. The width of each ridge-shaped portion 16 in the y direction is 0.3 μm or more and 5.0 μm or less, for example, and the height of each ridge-shaped portion 16 (protrusion height from the first surface 40a) is 0.1 μm or more and 1.0 μm or less, for example. The ridge-shaped portions are constituted of the same material as the oxide film 40.

For example, the oxide film 40 is a c-axis-oriented lithium niobate film. For example, the oxide film 40 is an epitaxial film epitaxially grown on the substrate Sb. An epitaxial film indicates a single crystal film of which the crystal orientation is aligned by the substrate (base material). An epitaxial film is a film which has a single crystal orientation in the z direction and an in-plane (xy) direction and in which crystals are oriented in a manner of being aligned together in an x axis direction, a y axis direction, and a z axis direction. For example, it is possible to verify whether or not there is an epitaxial film by checking a peak intensity and a pole at an orientation position in 2θ-θ X-ray diffraction. In addition, the oxide film 40 may be a lithium niobate film provided on a Si substrate with $SiO_2$ therebetween.

Specifically, when measurement is performed by 2θ-θ X-ray diffraction, all peak intensities other than that on a target surface are equal to or less than 10% and preferably equal to or less than 5% of the maximum peak intensity of the target surface. For example, when the oxide film 40 is a c-axis-oriented epitaxial film, the peak intensity other than that in a (00L) plane is equal to or less than 10% and preferably equal to or less than 5% of the maximum peak intensity of the (00L) plane. Here, (00L) is generic expression of equivalent planes such as (001) and (002).

In addition, conditions for checking the peak intensity at the orientation position described above simply indicate orientations in one direction. Thus, even if the condition described above is obtained, when the crystal orientations are not aligned within a plane, the X-ray intensity at a particular angular position does not increase and no pole is seen. For example, when the oxide film 40 is a lithium niobate film, since $LiNbO_3$ has a crystal structure of a trigonal system, there are three poles of $LiNbO_3$ (014) in a single crystal. In the case of lithium niobate, it is known to epitaxially grow in a so-called twin crystal state in which crystals rotated about the c axis by 180° are symmetrically coupled. In this case, since two of three poles are in a symmetrically coupled state, there are six poles. In addition, when a lithium niobate film is formed on a silicon single crystal substrate of a (100) plane, since a substrate has four-fold symmetry, 12 poles (4×3) are observed. In the present disclosure, an epitaxial film also includes a lithium niobate film which has epitaxially grown in a twin crystal state.

The composition of lithium niobate is $Li_xNbA_yO_z$. A is an element other than Li, Nb, and O. The subscript x is 0.5 or more and 1.2 or less and preferably 0.9 or more and 1.05 or less. The subscript y is 0 or more and 0.5 or less. The subscript z is 1.5 or more and 4.0 or less and preferably 2.5 or more and 3.5 or less. Examples of the element of A include K, Na, Rb, Cs, Be, Mg, Ca, Sr, Ba, Ti, Zr, Hf, V, Cr, Mo, W, Fe, Co, Ni, Zn, Sc, and Ce, and two or more kinds of these elements may be combined.

The film thickness of the oxide film 40 is 2 μm or smaller, for example. The film thickness of the oxide film 40 is a film thickness of a part other than the ridge-shaped portions. If the film thickness of the oxide film 40 is large, there is concern that crystallinity may deteriorate. In addition, the film thickness of the oxide film 40 is approximately 1/10 or larger than the wavelength of light used, for example. If the film thickness of the oxide film 40 is small, confinement of light becomes weak, and light leaks to the substrate Sb or a buffer layer 30. If the film thickness of the oxide film 40 is small, even if an electric field is applied to the oxide film 40, there is concern that change in effective refractive index of the optical waveguide 10 may decrease.

The electrodes 21 and 22 are electrodes for applying the modulation voltage Vm to the optical waveguide 10. The electrode 21 is an example of a first electrode, and the electrode 22 is an example of a second electrode. A first end 21a of the electrode 21 is connected to a power supply 31, and a second end 21b is connected to a terminal resistor 32. A first end 22a of the electrode 22 is connected to the power supply 31, and a second end 22b is connected to the terminal resistor 32. The power supply 31 is a part of the drive circuit 110 for applying the modulation voltage Vm to the optical modulation element 100.

The electrodes 23 and 24 are electrodes for applying a DC bias Vdc to the optical waveguide 10. A first end 23a of the electrode 23 and a first end 24a of the power supply 24 are connected to a power supply 33. The power supply 33 is a part of the DC bias application circuit 120 for applying the DC bias voltage Vdc to the optical modulation element 100.

In FIG. 3, line widths and line spacings of the electrode 21 and the electrode 22 disposed in a parallel manner are made wider than actual measurements for better visibility. For this reason, although the length of a part in which the electrode 21 and the first optical waveguide 11 overlap (interaction length) and the length of a part in which the electrode 22 and the second optical waveguide 12 overlap appear different, the lengths (interaction lengths) thereof are substantially the same. Similarly, the length of a part in which the electrode 23 and the first optical waveguide 11 overlap (interaction length) and the length of a part in which the electrode 24 and the second optical waveguide 12 overlap (interaction length) are substantially the same.

In addition, when the DC bias voltage Vdc overlaps the electrodes 21 and 22, the electrodes 23 and 24 may not be provided. In addition, ground electrodes may be provided around the electrodes 21, 22, 23, and 24.

The electrodes 21, 22, 23, and 24 are located on the oxide film 40 with the buffer layer 30 sandwiched therebetween. Each of the electrodes 21 and 23 can apply an electric field to the first optical waveguide 11. Each of the electrodes 21 and 23 is located at a position overlapping the first optical waveguide 11 in a plan view in the z direction, for example. Each of the electrodes 21 and 23 is located above the first optical waveguide 11. Each of the electrodes 22 and 24 can apply an electric field to the second optical waveguide 12. Each of the electrodes 22 and 24 is located at a position overlapping the second optical waveguide 12 in a plan view in the z direction, for example. Each of the electrodes 22 and 24 is located above the second optical waveguide 12.

The buffer layer 30 is located between the optical waveguide 10 and the electrodes 21, 22, 23, and 24. The buffer layer 30 covers and protects the ridge-shaped portions. In addition, the buffer layer 30 prevents light propagated through the optical waveguide 10 from being absorbed into the electrodes 21, 22, 23, and 24. The buffer layer 30 has a lower refractive index than the oxide film 40. For example, the buffer layer 30 is made of $SiO_2$, $Al_2O_3$, $MgF_2$, $La_2O_3$, ZnO, $HfO_2$, MgO, $Y_2O_3$, $CaF_2$, $In_2O_3$, or the like, or a mixture of these.

The chip size of the optical modulation element 100 is 100 $mm^2$ or smaller, for example. If the chip size of the optical modulation element 100 is 100 $mm^2$ or smaller, it can be used as an optical modulation element for a data center.

The optical modulation element 100 can be produced by a known method. For example, the optical modulation element 100 is manufactured using a semiconductor process such as epitaxial growth, photolithography, etching, vapor phase growth, or metallization.

The optical modulation element 100 converts an electrical signal into an optical signal. The optical modulation element 100 modulates the input light $L_{in}$ to the output light $L_{out}$. First, modulation operation of the optical modulation element 100 will be described.

The input light $L_{in}$ input from the input path 13 branches into the first optical waveguide 11 and the second optical waveguide 12 and is propagated. The phase difference between light propagated through the first optical waveguide 11 and light propagated through the second optical waveguide 12 is zero at the point of time it branches.

Next, an applied voltage is applied to a part between the electrode 21 and the electrode 22. For example, differential signals having the same absolute values, polarities opposite to each other, and phases not deviating from each other may be respectively applied to the electrode 21 and the electrode 22. The refractive indices of the first optical waveguide 11 and the second optical waveguide 12 change due to an electro-optic effect. For example, the refractive index of the first optical waveguide 11 changes by +Δn from a reference refractive index n, and the refractive index of the second optical waveguide 12 changes by −Δn from the reference refractive index n.

The difference between the refractive indices of the first optical waveguide 11 and the second optical waveguide 12 creates a phase difference between light propagated through the first optical waveguide 11 and light propagated through the second optical waveguide 12. Rays of light propagated through the first optical waveguide 11 and the second optical waveguide 12 join together in the output path 14 and are output as the output light $L_{out}$. The output light $L_{out}$ is superimposed light of light propagated through the first optical waveguide 11 and light propagated through the second optical waveguide 12. The intensity of the output light $L_{out}$ changes in accordance with an odd multiple of the phase difference between light propagated through the first optical waveguide 11 and light propagated through the second optical waveguide 12. For example, when the phase difference is an even multiple of π, rays of the light are mutually intensified, and when the phase difference is an odd multiple of π, rays of the light are mutually weakened. In such a procedure, the optical modulation element 100 modulates the input light $L_{in}$ to the output light $L_{out}$ in accordance with an electrical signal.

Figure 5:
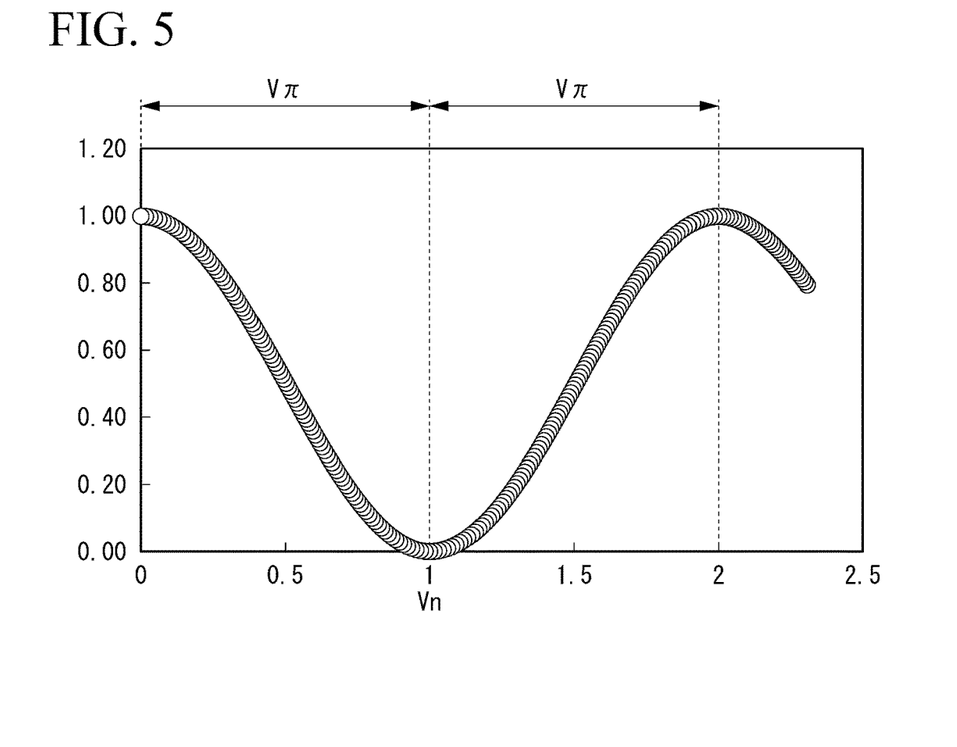
FIG. 5 is a view illustrating a relationship between an applied voltage and an output of the optical modulator according to the first embodiment.

Optical modulation by the optical modulation element 100 will be described using FIG. 5. FIG. 5 is a view illustrating a relationship between an applied voltage and an output of the optical modulator 200 according to the first embodiment. In FIG. 5, the horizontal axis indicates a voltage applied to the optical modulation element 100, and the vertical axis indicates a standardized output from the optical modulation element 100. An output is standardized as "1" when the phase difference between light propagated through the first optical waveguide 11 and light propagated through the second optical waveguide 12 is zero.

Next, a null point voltage Vn and a half-wavelength voltage Vπ will be described. The output of the optical modulation element 100 is maximized when the applied voltage is zero. This is because the phase difference between light propagated through the first optical waveguide 11 and light propagated through the second optical waveguide 12 is zero when the applied voltage is zero. As the applied voltage is increased, an output from the optical modulation element 100 gradually decreases and becomes extremely small at a certain point. The voltage at which an output from the optical modulation element 100 becomes extremely small is the null point voltage Vn. A half-wavelength voltage (half-wavelength phase modulation voltage) is a voltage for making the phase difference of light 180° using a Mach-Zehnder-type optical modulator, and a voltage width in which an output from the optical modulation element 100 reaches the minimum from the maximum corresponding to the half-wavelength voltage Vπ. If a voltage exceeding the null point voltage Vn is applied, an output from the optical modulation element 100 periodically changes. An output from the optical modulation element 100 repeats the maximum and the minimum for each half-wavelength voltage Vπ.

The half-wavelength voltage Vπ of the optical modulation element 100 changes depending on the constitution of the optical modulation element 100. For example, the half-wavelength voltage Vπ changes depending on the length of the electrode 21 on the first optical waveguide 11, the length of the electrode 22 on the second optical waveguide 12, and the like. Here, the length of the first electrode 21 and the length of the second electrode 22 are lengths in a propagation direction of light. In the case of FIG. 3, it is a length of a part of the electrode 21 overlapping the first optical waveguide 11 or a length of a part of the electrode 22 overlapping the second optical waveguide 12. This length is referred to as an interaction length. If the interaction length is long, the half-wavelength voltage Vπ decreases, and if the interaction length is short, the half-wavelength voltage Vπ increases.

In the optical modulation element 100, a first interaction length $L_1$ that is a length of a part of the first electrode 21 overlapping the first optical waveguide 11 in a longitudinal direction is 0.9 mm or more and 20 mm or less. When the first interaction length $L_1$ is shorter than 0.9 mm, an extinction ratio of 3 dB or larger required for a data center cannot be obtained by low-voltage driving of 2.0 V or more and 4.3 V or less. For this reason, the first interaction length $L_1$ is 0.9 mm or longer.

When the first interaction length $L_1$ is longer than 20 mm, attenuation in a high-frequency band of 60 GHz or higher is significant. For this reason, the first interaction length $L_1$ is 20 mm or shorter. Similarly, a second interaction length $L_2$ that is a length of a part of the second electrode 22 overlapping the second optical waveguide 12 in the longitudinal direction is 0.9 mm or more and 20 mm or less.

The first electrode 21 and the second electrode 22 are formed such that the first interaction length $L_1$ and the second interaction length $L_2$ become substantially the same. In FIG. 3, although the first interaction length $L_1$ and the second interaction length $L_2$ appear different, the first electrode 21 and the second electrode 22 actually have narrow line widths of the electrodes, and the gap between the first electrode 21 and the second electrode 22 is also narrow. Therefore, the interaction lengths of the two electrodes become substantially the same.

The modulation voltage Vm corresponding to a modulation signal is applied to the electrodes 21 and 22 for applying a modulation voltage of the optical modulation element 100. A voltage applied to the electrodes 23 and 24 for applying a DC bias voltage, namely, the DC bias voltage Vdc output from the DC bias application circuit 120 is controlled by the DC bias control circuit 130. The DC bias control circuit 130 adjusts the operating point Vd of the optical modulation element 100 by controlling the DC bias voltage Vdc. The operating point Vd is a voltage at the center of the amplitude of a modulation voltage.

The DC bias application circuit 120 controls an operating point voltage Vd of the optical modulation element 100. The operating point voltage Vd is a midpoint between a minimum value (Vmin) and a maximum value (Vmax) of an applied voltage. Further, the difference between the minimum value (Vmin) and the maximum value (Vmax) of an applied voltage is an applied voltage width Vpp.

The operating point voltage Vd may fluctuate due to a temperature or the like of a usage environment. When the operating point voltage Vd fluctuates while being used, the operating point voltage Vd is corrected by the DC bias control circuit 130 in accordance with the set applied voltage width Vpp such that it is included within a range in which the operating point voltage has an extinction ratio of 3 dB or larger. For example, the DC bias control circuit 130 corrects fluctuation of the operating point voltage Vd on the basis of branch light $L_b$ which has branched from the output light $L_{out}$.

In addition, the drive circuit 110 controls the applied voltage width Vpp applied to the optical modulation element 100. The applied voltage width Vpp applied to the optical modulation element is a range of 2.0 V or more and 4.3 V or less. If the interaction length is 0.9 mm or more and 20.0 mm or less, the extinction ratio can become 3 dB or larger in the applied voltage width Vpp of 2.0 V or more and 4.3 V or less. The drive circuit 110 inputs an electrical signal converted into an optical signal to the optical modulation element 100. For example, the drive circuit 110 includes a power supply, a driver, and the like.

Figure 6:
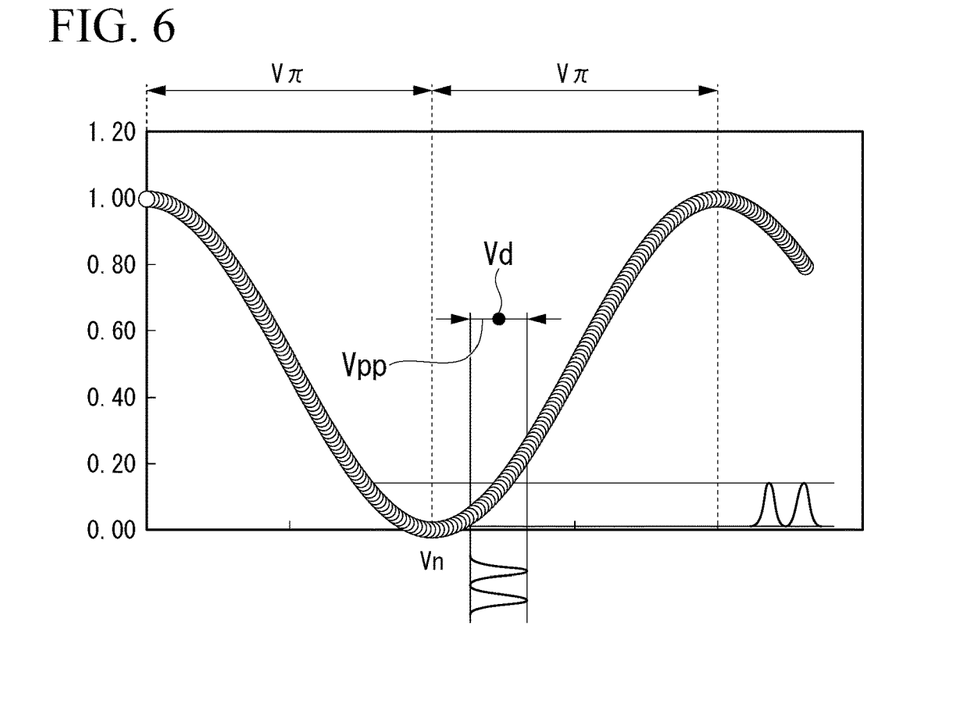
FIG. 6 is an explanatory view of a voltage width of the optical modulator according to the first embodiment.

FIG. 6 is an explanatory view of the applied voltage width Vpp of the optical modulator 200 according to the first embodiment. FIG. 6 is a view illustrated by adding description of the applied voltage width Vpp to FIG. 5.

The applied voltage width Vpp becomes a range of a voltage utilized when the optical modulation element 100 is operated. The applied voltage width Vpp is applied to the optical modulation element 100 with the operating point voltage Vd as the midpoint. An output from the optical modulation element 100 changes in a range corresponding to the minimum value (Vmin) of an applied voltage and the maximum value (Vmax) of the applied voltage. The half-wavelength voltage Vπ is equal to or higher than the applied voltage width Vpp. The operating point voltage Vd is set such that the minimum value (Vmin) of a voltage applied to the optical modulation element 100 becomes equal to or larger than the null point voltage Vn, but it may be set such that the maximum value (Vmax) becomes equal to or smaller than the null point voltage Vn.

For example, a modulation signal at a high-frequency voltage is controlled by the drive circuit 110. The band of a modulation element is 60 GHz or higher. If the frequency band of the modulation element is 60 GHz or higher, it is easy to cope with high-speed modulation.

Figure 7:
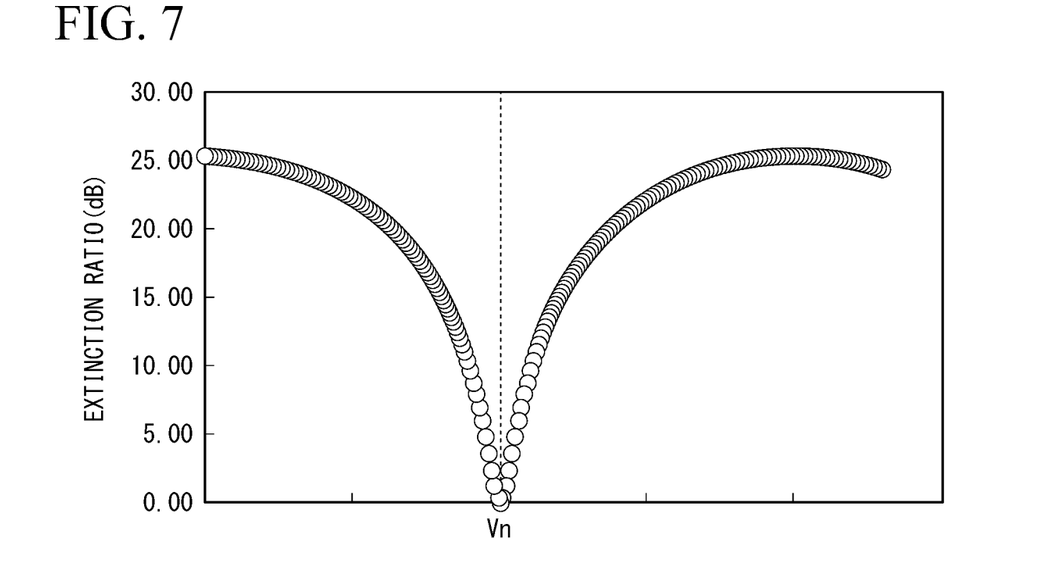
FIG. 7 is a view illustrating a relationship between an applied voltage and an extinction ratio of the optical modulator according to the first embodiment.

FIG. 7 is a view illustrating a relationship between an applied voltage and an extinction ratio of the optical modulator 200 according to the first embodiment. In FIG. 7, the horizontal axis indicates a voltage applied to the optical modulation element 100, and the vertical axis indicates a ratio between the output light $L_{out}$ in an applied voltage and the output light $L_{out}$ in the null point voltage Vn. The extinction ratio is a ratio of the maximum value and the minimum value of the output light $L_{out}$ within a range of an applied voltage.

As described above, the optical modulation element 100 and the optical modulator 200 according to the first embodiment can be driven at a low voltage and can be used in a high-frequency band.

Thus far, the optical modulation element 100 and the optical modulator 200 according to the first embodiment have been described as an example. However, the present invention is not limited to the first embodiment, and various modifications can be made.

For example, the first interaction length $L_1$ and the second interaction length $L_2$ may be set to 18.6 mm or shorter. When the first interaction length $L_1$ and the second interaction length $L_2$ are set to 18.6 mm or shorter, response characteristics are improved even in a high-frequency band of 70 GHz or higher. Moreover, when they are set to 16.9 mm or shorter, response characteristics are improved even in a high-frequency band of 80 GHz or higher. When they are set to 14.4 mm or shorter, response characteristics are improved even in a higher frequency band.

In addition, in the optical modulator of the first embodiment, the operating point voltage Vd has been controlled, but the minimum value (Vmin) or the maximum value (Vmax) of a voltage applied to the optical modulation element 100 may be controlled. When the minimum value (Vmin) is controlled, the minimum value (Vmin) is controlled to be equal to or larger than the null point voltage Vn. Meanwhile, when the maximum value (Vmax) is controlled, the maximum value (Vmax) is controlled to be equal to or smaller than the null point voltage Vn.

It is preferable that Vpp/Vx be 0.03 or more and 0.47 or less. In this range, it is possible to have an extinction ratio of 3 dB or larger and a frequency band of the modulation element of 60 GHz or higher.

The chip size of the optical modulation element 100 may be set to 100 mm² or smaller and more preferably 50 mm² or smaller. If the chip size of the optical modulation element 100 is reduced, it can also be used in existing transceivers for a data center.

Figure 8:
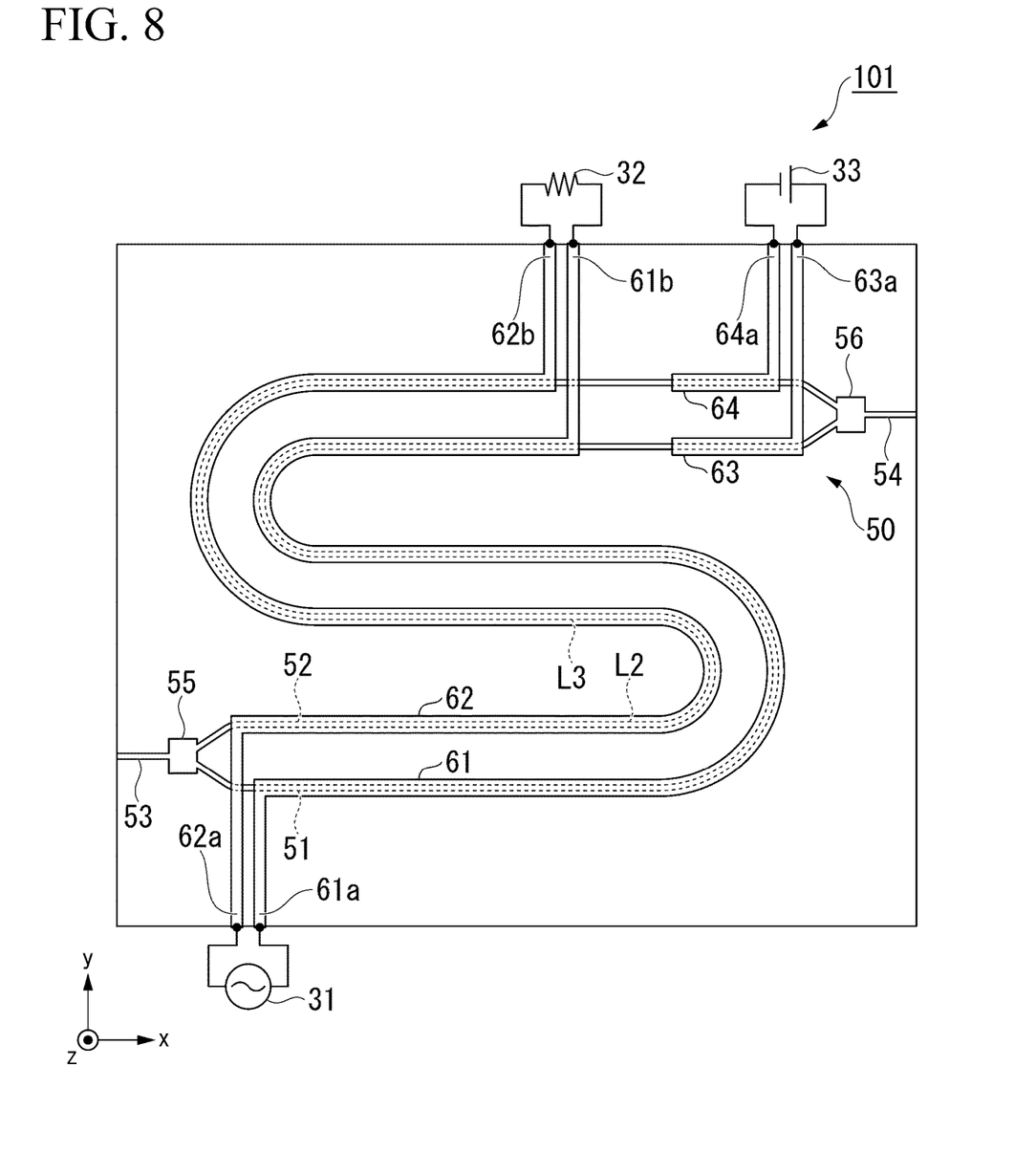
FIG. 8 is a plan view of an optical modulation element according to a first modification example.

In addition, FIG. 8 is a plan view of an optical modulation element 101 according to a first modification in a plan view in the z direction. The optical modulation element 101 has an optical waveguide 50 and electrodes 61, 62, 63, and 64.

The optical waveguide 50 has a first optical waveguide 51, a second optical waveguide 52, an input path 53, an output path 54, a branch portion 55, and a coupling portion 56. The optical waveguide 50 differs from the optical waveguide 10 in that the first optical waveguide 51 and the second optical waveguide 52 are curved in the middle thereof. The optical waveguide 50 is otherwise similar to the optical waveguide 10.

The electrodes 61 and 62 are electrodes for applying the modulation voltage Vm to the optical waveguide 50. The electrode 61 is an example of the first electrode, and the electrode 62 is an example of the second electrode. A first end 61a of the electrode 61 is connected to the power supply 31, and a second end 61b is connected to the terminal resistor 32. A first end 62a of the electrode 62 is connected to the power supply 31, and a second end 62b is connected to the terminal resistor 32. The electrodes 63 and 64 are electrodes for applying the DC bias Vdc to the optical waveguide 50. A first end 63a of the electrode 63 and a first end 64a of the power supply 64 are connected to the power supply 33.

In FIG. 8, since the line widths and the line spacings of the electrode 61 and the electrode 62 disposed in a parallel manner are made wider, although the length of a part in which the electrode 61 and the first optical waveguide 51 overlap and the length of a part in which the electrode 62 and the second optical waveguide 52 overlap are illustrated such that they are different, the lengths thereof are substantially the same. Similarly, the length of a part in which the electrode 63 and the first optical waveguide 51 overlap and the length of a part in which the electrode 64 and the second optical waveguide 52 overlap are substantially the same.

The electrode 61 and the electrode 62 differ from the electrode 21 and the electrode 22 in that they are curved along the first optical waveguide 51 and the second optical waveguide 52. Each of the electrodes 61, 62, 63, and 64 is otherwise similar to each of the electrodes 21, 22, 23, and 24.

In the optical modulation element 101, since the first optical waveguide 51 and the second optical waveguide 52 are curved, the element size in the x direction is small. For example, the optical modulation element 101 can be realized to have an element size of 100 mm$^2$ or smaller and preferably 50 mm$^2$ or smaller. An optical modulator for a data center is required to be miniaturized. Since the optical waveguide 50 is curved, the optical modulation element 101 can also be accommodated in a small-sized region corresponding to an existing optical modulator for a data center.

EXAMPLES

Hereinafter, Examples of the present disclosure will be exemplified, but the present disclosure is not limited to the following Examples.

It is obvious that those skilled in the art can conceive of various modification examples or revision examples within the scope of the idea described in the claims, and it is understood that these naturally belong to the technical scope of the present disclosure.

EXAMPLES

The structures in FIGS. 3 and 4 were actually made as a trial in the following procedure. Sapphire was used as the material of the substrates. A lithium niobate film having a film thickness of 1.5 μm was produced on surfaces of the substrates by a sputtering method. Next, a buffer layer having a film thickness of 0.8 μm and made of a material LaAlO$_3$ was formed on the lithium niobate film by a vapor deposition method. The ridge-shaped portions were formed by forming a mask using a resist and performing dry etching processing using Ar plasma. The ridge widths of the ridge-shaped portions were set to 2.5 μm, and the ridge heights were set to 0.4 μm. Last, the first electrode and the second electrode were formed by a photolithography step and a gold plating step. The relative dielectric constant of LaAlO$_3$ was 13.

Regarding the obtained optical modulators, modulation characteristics were evaluated using light having a wavelength of 1,310 nm. Tables 1 and 2 show the half-wavelength voltages Vπ (Vpi) (V), the applied voltage widths Vpp (V), the maximum values of the extinction ratio ER (ERmax) (dB), and the available high-frequency ranges RF (GHz) when the interaction length L was varied while having the applied voltage width set to 2 V and 4.3 V. Here, the first interaction length $L_1$ and the second interaction length $L_2$ were the same values and was expressed as the interaction length L in Table 1.

TABLE 1

| L (mm) | Vpi (V) | Vpp (V) | Vpp/Vpi | ERmax (dB) | RF (GHz) |
|---|---|---|---|---|---|
| 0.6 | 101 | 2.0 | 0.02 | 2.4 | >80 |
| 0.9 | 66.4 | 2.0 | 0.03 | 3.5 | >80 |

TABLE 1-continued

| L (mm) | Vpi (V) | Vpp (V) | Vpp/Vpi | ERmax (dB) | RF (GHz) |
|---|---|---|---|---|---|
| 1.1 | 56.4 | 2.0 | 0.04 | 4.1 | >80 |
| 1.4 | 46.6 | 2.0 | 0.04 | 4.9 | >80 |
| 1.9 | 33.3 | 2.0 | 0.06 | 6.6 | >80 |
| 5.9 | 11.4 | 2.0 | 0.18 | 14.0 | >80 |
| 8.5 | 8.3 | 2.0 | 0.24 | 16.5 | >80 |
| 14.4 | 5.5 | 2.0 | 0.36 | 19.7 | >80 |
| 16.9 | 4.9 | 2.0 | 0.41 | 20.6 | 80 |
| 18.6 | 4.7 | 2.0 | 0.43 | 20.9 | 70 |
| 20.0 | 4.3 | 2.0 | 0.47 | 21.5 | 60 |
| 22.0 | 4.1 | 2.0 | 0.49 | 21.9 | 50 |

TABLE 2

| L (mm) | Vpi (V) | Vpp (V) | Vpp/Vpi | ERmax (dB) | RF (GHz) |
|---|---|---|---|---|---|
| 0.3 | 241 | 4.3 | 0.02 | 2.2 | >80 |
| 0.4 | 143 | 4.3 | 0.03 | 3.5 | >80 |
| 0.6 | 101 | 4.3 | 0.04 | 4.9 | >80 |
| 0.9 | 66.4 | 4.3 | 0.06 | 7.1 | >80 |
| 1.1 | 56.4 | 4.3 | 0.08 | 8.0 | >80 |
| 1.4 | 46.6 | 4.3 | 0.09 | 9.2 | >80 |
| 1.9 | 33.3 | 4.3 | 0.13 | 11.7 | >80 |
| 5.9 | 11.4 | 4.3 | 0.38 | 20.0 | >80 |
| 8.5 | 8.3 | 4.3 | 0.52 | 22.3 | >80 |
| 14.4 | 5.5 | 4.3 | 0.78 | 24.5 | >80 |
| 16.9 | 4.9 | 4.3 | 0.88 | 24.8 | 80 |
| 18.6 | 4.7 | 4.3 | 0.91 | 24.9 | 70 |
| 20.0 | 4.3 | 4.3 | 1.00 | 25.0 | 60 |
| 22.0 | 4.1 | 4.3 | 1.05 | 25.0 | 50 |

As shown in Tables 1 and 2, if the interaction length L is in a range of 0.4 mm to 20 mm while having Vpp set to 4.3 V, it has been confirmed that the optical modulator can be used at 60 GHz or higher and the extinction ratio of 3 dB or larger can be obtained. Moreover, if the interaction length L is in a range of 0.9 mm or more and 20 mm or less while having Vpp set to 2.0 V, it has been confirmed that the optical modulator can be used at 60 GHz or higher and the extinction ratio of 3 dB or larger can be obtained.

REFERENCE SIGNS LIST 10, 50 Optical waveguide
11, 51 First optical waveguide
12, 52 Second optical waveguide
13, 53 Input path
14, 54 Output path
15, 55 Branch portion
16, 56 Coupling portion
21, 22, 23, 24, 61, 62, 63, 64 Electrode
30 Buffer layer
40 Oxide film
40a First surface
100, 101 Optical modulation element
110 Drive circuit
120 DC bias application circuit
130 DC bias control circuit
200 Optical modulator
$L_{in}$ Input light
$L_{out}$ Output light
$L_b$ Branch light
Vd Operating point voltage
Vn Null point voltage
Vπ Half-wavelength voltage
Vpp Applied voltage width

The invention claimed is:

1. An optical modulation element comprising:
   a first optical waveguide;
   a second optical waveguide;
   a first electrode configured to apply an electric field to the first optical waveguide; and
   a second electrode configured to apply an electric field to the second optical waveguide,
   wherein each of the first optical waveguide and the second optical waveguide includes a ridge-shaped portion protruding from a first surface of a lithium niobate film,
   wherein a first interaction length $L_1$ that is a length of a part of the first electrode overlapping the first optical waveguide in a longitudinal direction is 0.9 mm or more and 20 mm or less,
   wherein a second interaction length $L_2$ that is a length of a part of the second electrode overlapping the second optical waveguide in the longitudinal direction is 0.9 mm or more and 20 mm or less, and
   wherein an applied voltage width Vpp that is an amplitude of an applied voltage applied to a part between the first electrode and the second electrode is 2.0 V or more and 4.3 V or less, and a half-wavelength voltage Vπ is equal to or higher than the applied voltage width Vpp.

2. A method for comprising driving an optical modulation element which has a first optical waveguide and a second optical waveguide, each of which includes a ridge-shaped portion protruding from a first surface of a lithium niobate film, a first electrode at a position overlapping the first optical waveguide in a plan view, and a second electrode at a position overlapping the second optical waveguide in a plan view, and in which a first interaction length $L_1$ that is a length of a part of the first electrode overlapping the first optical waveguide in a longitudinal direction is 0.9 mm or more and 20 mm or less and a second interaction length $L_2$ that is a length of a part of the second electrode overlapping the second optical waveguide in the longitudinal direction is 0.9 mm or more and 20 mm or less,
   wherein an applied voltage width Vpp that is an amplitude of an applied voltage applied to a part between the first electrode and the second electrode is 2.0 V or more and 4.3 V or less, and a half-wavelength voltage Vπ is equal to or higher than the applied voltage width Vpp.

3. The method for driving an optical modulation element according to claim 2,
   wherein an applied voltage is set such that Vpp/Vπ becomes 0.03 or more and 0.47 or less.

* * * * *